Dec. 30, 1969  MINORU SUZUKI ET AL  3,486,434
LENS COMPENSATED LIGHT MEASURING SYSTEM IN SINGLE
LENS REFLEX CAMERA
Filed July 18, 1967  2 Sheets-Sheet 1
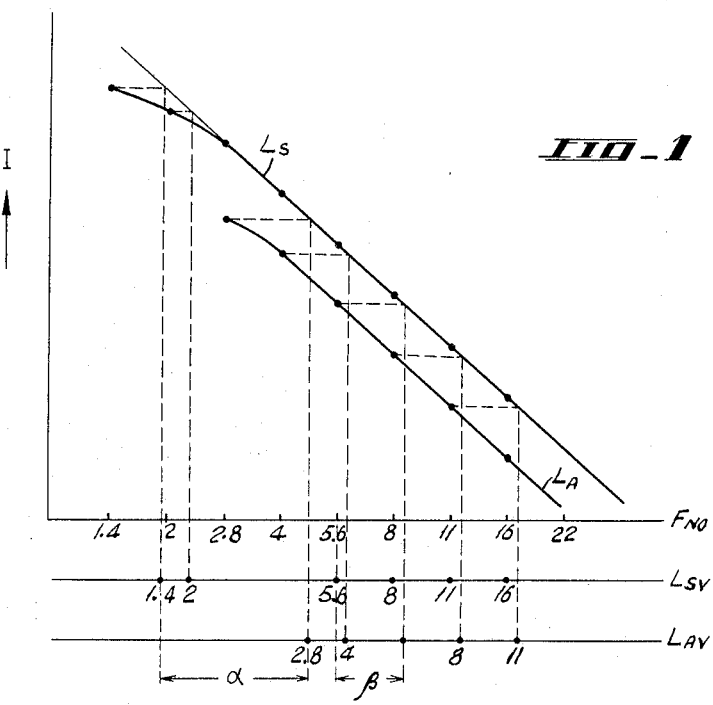
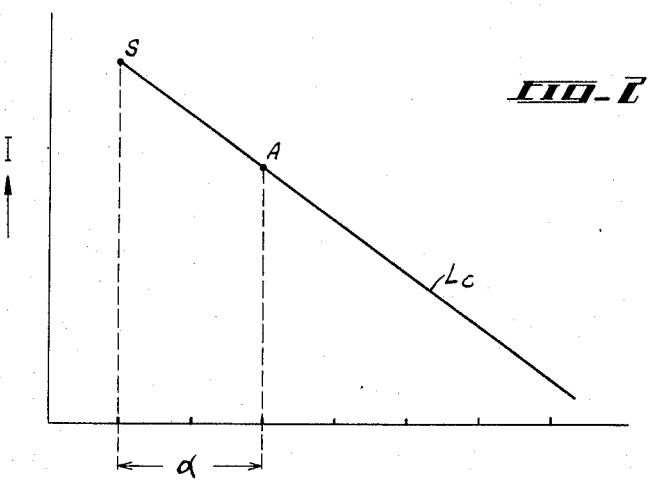
INVENTORS
MINORU SUZUKI
NAOYUKI UNO
BY
ATTORNEY

United States Patent Office 3,486,434
Patented Dec. 30, 1969

3,486,434
LENS COMPENSATED LIGHT MEASURING SYSTEM IN SINGLE LENS REFLEX CAMERA
Minoru Suzuki, Tokyo-to, and Naoyuki Uno, Urawa-shi, Japan, assignors to Asahi Kogaku Kogyo Kabushiki Kaisha, Tokyo-to, Japan, a Japanese Corporation
Filed July 18, 1967, Ser. No. 654,251
Claims priority, application Japan, July 30, 1966, 41/49,771
Int. Cl. G03b 9/02
U.S. Cl. 95—64     6 Claims

ABSTRACT OF THE DISCLOSURE

A single lens reflex camera includes a plurality of interchangeable lenses having different fully open apertures and light transmission properties and a through the lens light measuring system comprising a differential meter having a first winding connected to a voltage source through a photoconductor and an opposing second winding. The light measuring system is automatically correlated to the fully open aperture and other properties of the objective lens by a linearly variable resistor connected through the voltage source to the second winding, the resistor being set to an adjusted position by an index element positioned on the objective lens in accordance with its fully open aperture and other properties.

BACKGROUND OF THE INVENTION

The present invention relates generally to improvements in camera associated light meausring systems and it relates particularly to improved through the lens light measuring systems in single lens reflex cameras provided with interchangeable lenses of different characteristics.

The conventional objective interchangeable single lens reflex camera with a built-in light measuring system in which the light sensitive element is arranged in the photographing light path or behind the viewfinder image forming plane, that is, the internal light receiving light measurement or TTL system, is generally operated so as to determin the required exposure with a fully open diaphragm, actual measurement being made with respect to the light from the object that has passed through the camera objective and reaches the film surface. Such manner of measurement, however, is still not optimum for accurately determining exposure parameters even if the light receiving element is placed at the film surface position for more precise results. For accurate light measurement, indication compensation must of course, be effected with respect to the difference in the largest relative aperture of the interchangeable objective used, and further, compensation is also necessary for the reasons and conditions hereinafter set forth.

The film brightness according to the above light measurement system with the same $F_{NO}$ differs with the interchangeable objective used due to differences in the optical characteristics and conditions of the interchangeable objectives used due to differences in the optical characteristics and condtions of the interchangeable objectives used. Among such optical characteristics and conditions are the lens system structure, the light absorption factor of the lens material, the reflecting ratio and the degree of the diffuse reflection of the lens barrel, the influence of obliquely incident light, the position and the size of the proper exit pupil, the degree of vignetting, etc.

Compensation is also necessary with respect to the light measurement characteristic which differs with the location of the light receiving element within the camera body.

The conventional single lens reflex camera provided with a TTL light measuring system thus possesses important drawbacks and disadvantages which are consequent to the different maximum aperture and other optical characteristics of the interchangeable lenses employed therewith.

BRIEF DESCRIPTION OF THE DRAWINGS

FIGURE 1 is a graph illustrating the measurement error in a TTL light measuring system accompanying the use of objective lenses of different optical characteristics where the light receiving photosensitive element is at the film surface;

FIGURE 2 is a graph similar to FIGURE 1 illustrating the measurement error with respect to the actual light amount at the light receiving photosensitive element of the exposure meter.

SUMMARY OF THE INVENTION

Figure 3:
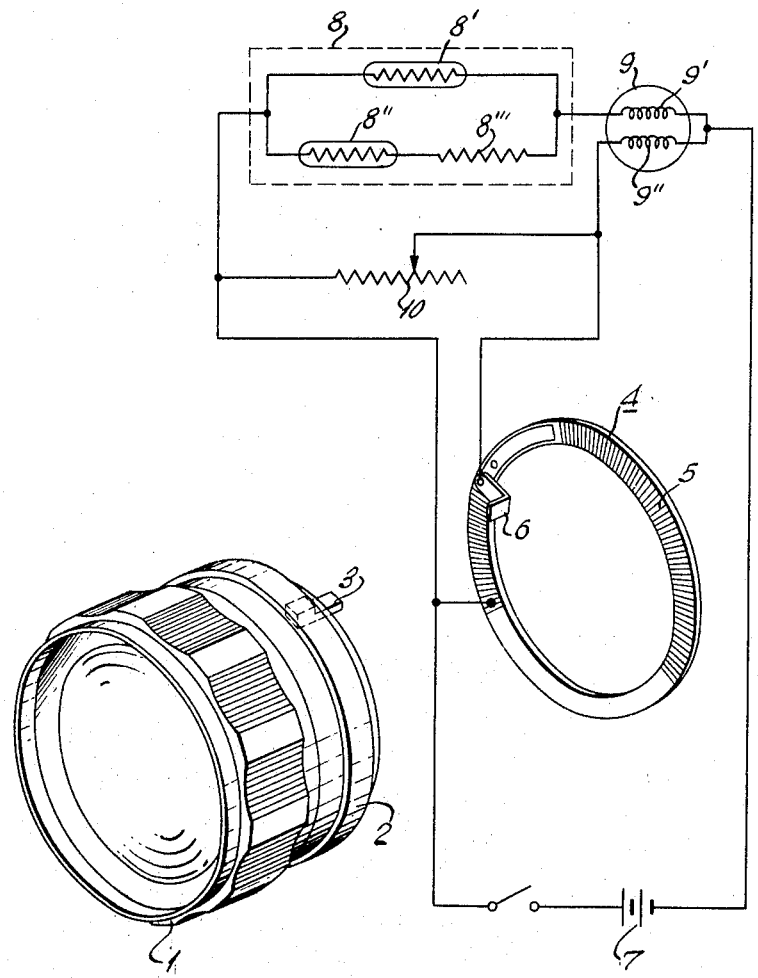
FIGURE 3 is an exploded perspectvie and schematic view of a system embodying the present invention.

A principal object of the present invention is to provide an improved camera associated light measuring system.

Another object of the present invention is to provide an improved light measuring system in a single lens reflex camera provided with interchangeable objectives.

Still another object of the present invention is to provide an improved TTL light measuring system in a single lens reflex camera provided with interchangeable objectives.

A further object of the present invention is to provide a system of the above nature characterized by its reliability, versatility, adaptability, and accuracy.

The above and other objects of the present invention will become apparent from a reading of the following description taken in conjunction with the accompanying drawings. It should be noted, that for an easier understanding of FIGURES 1 and 2 of the drawings, it is assumed that the object to be photographed is of uniform brightness and located at infinity.

In FIG. 1 which illustrates the $T_{NO}$ current relation with the light receiving element arranged at the film surface position. The thick lines $L_S$ and $L_A$ show actually measured current values with respect to the $F_{NO}$ scale of the interchangeable objective barrel, $L_S$ showing the characteristic of the standard interchangeable objective and $L_A$ showing the characteristic of a certain interchangeable objective. The thin line indicates the brightness-current characteristic which is independent of the difference in the lens systems.

The non-linearity of the leftside-upper portions of the thick lines $L_S$ and $L_A$ is due to the increase in the influence of vignetting, etc. near fully open diaphragm; and the approximate parallelness of the thick lines $L_S$ and $L_A$ is due to a difference in the light dissipation or the effective light amount passing through corresponding lens systems which are different from each other in the aforementioned optical characteristics and conditions. The scale immediately below the transverse $F_{NO}$ axis is a $T_{NO}$ scale. From a point on the thick line $L_S$ which corresponds to each $F_{NO}$ there is extended a line parallel to the transverse axis to intersect the thin line. A line is extended from this intersecting point below in parallel with the axis of ordinates to intersect said $T_{NO}$ scale line. Said $F_{NO}$ value is attached to this intersecting point. The resulting scale is named $L_{SV}$. Similarly, the scale $L_{AV}$ is obtained immediately below said scale $L_{SV}$.

Thus, with the same F number as that of the standard objective, the film surface brightness differs with the interchangeable objective used depending on the different light dissipations. Let this difference be $\beta$ with unit EV.

In FIG. 2, the thick line $L_C$ shows the relationship between the light amount (unit: EV) and the current through the actual light measuring photo-sensitive element of the exposure meter. On the thick line $L_C$, the point S indicates the current value with fully open standard objective, while the point A indicates the current value with a certain fully open interchangeable objective. The difference in abscissa of the points S and A is the EV difference between fully open standard and interchangeable objectives. Let this EV difference be $\alpha$ with unit EV.

When the exposure factors other than diaphram opening are kept constant, in the standard objective camera the diaphragm-coupled operative member should be related to the resistor in the photoelectric circuit of the exposure meter in such a manner that proper exposure is accomplished in accordance with $L_{SV}$. When any other interchangeable objective is utilized, however, if the diaphragm-coupled operative member is operated in accordance with $L_{SV}$, exposure error will result owing to said $\alpha$ and $\beta$ relative to the standard objective as shown in FIGS. 1 and 2. In order to obtain the light measurement indication of the interchangeable objective equal to that according to $L_{SV}$, it will be necessary to provide a compensation $\alpha$ of the operation of the diaphragm-coupled operative member of the standard objective. Such compensation, however, still lacks the $T_{NO}$ compensation $\beta$ as explained with reference to FIG. 1.

Thus, for the correction of the light measurement indication error of internally light receiving or TTL type exposure meter due to the difference in the optical parameters of the interchangeable objectives and hence the different light dissipations, it will be necessary to regulate the operation of the diaphragm-coupled operative member, which determines the resultant resistance value, in accordance with the above mentioned $\alpha$ and $\beta$. With such regulation according to $\alpha$ and $\beta$, it is possible, at each diaphragm value, to obtain by an interchangeable objective an exposure which is equal to that by a standard objective.

The above correction method may be applied to a case where the exposure meter light measuring photosensitive element is arranged at the film surface position or to a case where it is arranged at some position behind the camera objective other than said film surface position, to obtain a proper exposure.

The present invention provides an arrangement for the correction of the above errors which are consequent to the aforementioned conditions. According to the present invention, in an internally light receiving or TTL light measurement type objective interchangeable single lens reflex camera, each interchangeable objective is provided with an operative member which reflects and applies the diaphragm condition, which is determined by light measurement with fully open diaphragm, to the light measurement indicating action as a displacement amount; and upon driving and causing the displacement of the diaphragm value setting member by said operative member coupled to said diaphragm value setting member, the starting point of said displacement is set in accordance with the film surface illumination due to the interchangeable objective used relative to that due to the standard objective and also in accordance with EV difference of the exposure meter light receiving part between the standard objective and the interchangeable objective used, with fully open diaphragm, so that the light measurement indication of each interchangeable objective may be such that will result in proper exposure.

DESCRIPTION OF THE PREFERRED EMBODIMENT

Referring now to FIGURE 3 of the drawings which illustrates a preferred embodiment of the present invention, the reference numeral 1 generally designates one of a plurality of different interchangeable objective lenses provided with an associated lens barrel having a rotatable diaphragm setting ring 2. Affixed to the ring 2 and movable therewith is a diaphragm operative or index number 3. The objective lenses 1 are interchangeably mounted on an associated single lens reflex camera.

The diaphragm value setting ring 2 is so arranged that, when coupled to the diaphragm, its equally spaced angular displacement causes a variation of film surface illumination in geometric progression with common ratio 2. When the diaphragm value setting ring 2 is at its starting point of its rotation, the diaphragm operative or index number 3 is set to a position relative to the resistance element 5 of the variable resistor 4 to be later described, in accordance with the film surface illumination due to the interchangeable objective lens 1 used relative to that due to the standard objective, and also is accordance with the fully open diaphragm EV difference between the standard objective and the interchangeable objective 1 used.

The variable resistor 4 is mounted within the camera body and is so arranged that, upon mounting the interchangeable objective 1 to the camera body, the variable resistor adjustable contact member 6 engages and comes under control of the diaphragm operative or index member 3 so hat the resistance value is varied in accordance with the position of the diaphragm operative member 3 relative to the resistor member 5. The variable resistor 4 is inserted in an exposure meter circuit containing a voltage source battery 7, a light receiving member 8 and an indicating meter 9 in series connection.

The light receiving member 8 comprises CdS photoconductor elements 8' and 8" and a resistor 8''' so that in response to variation of light receiving surface illumination in geometric progression with common ratio 2 the photoelectrically regulated current varies in arithmetic progression.

The indicating meter 9 is of the differential type containing windings 9' and 9" acting opposite to each other. A current under the control of the light receiving member 8 flows through the winding 9', while through the other winding 9" there flows a current controlled by the variable resistor 4 and also by another variable resistor 10 which is connected in parallel with the variable resistor 4 and is set in accordance with film sensitivity, shutter speed or a function of these. The variable resistor 10 is of such variation characteristic that variation of shutter time, etc. in geometric progression with common ratio 2 produces output current variation in arithmetic progression; and in the variable resistor 4 the resistance thereof and thus the current controlled thereby varies in arithmetic progression or linearly as the contact member 6 effects an angular movement along the resistance element 5.

Thus, because of output current variation in arithmetic progression of the exposure meter circuit elements, a diaphragm condition may be applied to the system by operating the diaphragm setting ring 2, in response to the condition of the object to be photographed as sensed by the light receiving part 8, over a wide range and always in an accurate manner.

When an interchangeable objective having a characteristic as indicated by the thick line $L_A$ of FIG. 1 is utilized or mounted on the associated camera, the position or starting point of the displacement of the diaphragm operative or index member 3 in the camera mounted position is in accordance with said condition requiring correction, namely said film surface illumination and fully open diaphragm EV difference of the light receiving part 8 that are proper to the interchangeable objective used. The diaphragm operative member 3 thus adjusted acts upon the contact member 6 to cause it to be displaced relative to the resistance element 5. Then the variable resistor 4 varies its resistance value so as to vary the differential operation of the indicating meter 9 regulated by the light receiving element 8. Thus the indication of said indicating meter 9 is properly corrected. Accordingly, the differences in the attenuation of the light traversing different objectives consequent to their fully open aperture and other optical conditions and characteristics are automatically compensated for.

In this manner, in utilizing any interchangeable objective, correction and compensation of the light measurement for variations and deviations due to different light absorption and transmission characteristics of interchangeable objectives may be carried out by correspondingly adjusting the starting point of the displacement of the diaphragm operative member.

Thus, according to the present invention, in internally light receiving light measurement system, the indication error, which is produced in whatever region the light receiving part may be located, can be well corrected with any interchangeable objective used, so that accurate light measurement is always possible corresponding to any interchangeable objective used.

In the aforementioned description, electrical means is utilized with variable resistors to correct the exposure meter light measurement indication. It should be understood, however, that instead of such electrical means, mechanical means may be introduced in such a manner that the coupling arrangement is so made that the indicating meter body itself or the index is displaced in accordance with the correction amount. Also, in a system where the exposure value setting operation is made in a purely electrical manner without utilizing an indicating meter, the desired correction can be carried out in accordance with the present invention by making such operations as making variable or change-over operation of the circuit elements, such as variable resistors or capacitors, etc. of the operative circuit of the system.

While there has been described and illustrated a preferred embodiment of the present invention, it is apparent that numerous alterations, omissions and additions may be made without departing from the spirit thereof.

What is claimed is:

1. A single lens reflex camera system comprising a camera body, a plurality of objective lenses of different light dissipation characteristics interchangeably mounted on said camera body and provided with adjustable diaphragms, a light measuring system including a light responsive element exposed to light traversing an objective lens mounted on said camera and an adjustable element correlating said light measuring system with said objective lens diaphragm opening, and an indexing member on each of said objective lenses movable with the adjustment of said respective diaphragm and separably coupled to said adjustable element, said indexing members being relatively offset in the direction of adjustment movement thereof from positions corresponding to a predetermined diaphragm opening by different amounts in the different objectives in accordance with the light dissipation characteristics thereof to compensate for such different characteristics.

2. The camera system of claim 1 wherein said light measuring system includes a meter responsive to the light incident on said light responsive element and said adjusting means comprises means for varying an electrical current to said meter.

3. The camera system of claim 1 wherein said light measuring system includes a meter responsive to the light incident on said light responsive element and said adjusting means comprises a variable resistor and a voltage source connected in series with said variable resistor to said meter, and a control element for said variable resistor engageable by said index elements.

4. The camera system of claim 1 wherein said light measuring system comprises a voltage source and a differential meter including opposing first and second windings, said light sensitive element comprising a photoconductor connected in series with said voltage source to said first winding and said adjusting means comprises a variable resistor connected in series with said second winding, and a control element for said variable resistor engagable by said index elements.

5. The camera system of claim 1 wherein said light measuring system comprises a voltage source and differential meter including opposing first and second windings, said light sensitive element comprising a photoconductor connected in series with said voltage source to said first winding and said adjusting means comprises a variable resistor connected in series with said voltage source to said winding and includes an arcuate linearly responsive resistance element coaxial with said second winding and a control element for said variable resistor engageable by said index elements and movable along a circular path coaxial with said objective lens.

6. The camera system of claim 1 wherein said light measuring system includes a meter responsive to the light incident on said light responsive element and said adjusting means comprises a variable resistor and a voltage source connected in series with said variable resistor to said meter and a control element for said variable resistor engageable by said index elements, and a second selectively adjustable variable resistor connected across said first variable resistor.

References Cited

UNITED STATES PATENTS 3,163,097   12/1964   Zenyoji et al. _____ 95—42 XR

NORTON ANSHER, Primary Examiner

RICHARD L. MOSES, Assistant Examiner

U.S. Cl. X.R.

95—10